United States Patent
Hagiwara

(10) Patent No.: US 9,208,540 B2
(45) Date of Patent: Dec. 8, 2015

(54) IMAGE PRODUCING METHOD, IMAGE PRODUCING APPARATUS AND RADIATION TOMOGRAPHIC IMAGING APPARATUS, AND PROGRAM

(71) Applicant: GE Medical Systems Global Technology Company, LLC, Waukesha, WI (US)

(72) Inventor: Akira Hagiwara, Tokyo (JP)

(73) Assignee: General Electric Company, Schenectady, NY (US)

( * ) Notice: Subject to any disclaimer, the term of this patent is extended or adjusted under 35 U.S.C. 154(b) by 282 days.

(21) Appl. No.: 13/923,105

(22) Filed: Jun. 20, 2013

(65) Prior Publication Data
US 2013/0343508 A1    Dec. 26, 2013

(30) Foreign Application Priority Data
Jun. 21, 2012 (JP) ................. 2012-139499

(51) Int. Cl.
G06T 5/00       (2006.01)
G06T 11/00      (2006.01)
(52) U.S. Cl.
CPC .............. G06T 5/001 (2013.01); G06T 11/006 (2013.01); G06T 2211/421 (2013.01)
(58) Field of Classification Search
CPC ................................................... A61B 6/4078
See application file for complete search history.

(56) References Cited

U.S. PATENT DOCUMENTS

| | | | |
|---|---|---|---|
| 5,047,931 A | 9/1991 | Lin | |
| 5,216,601 A | 6/1993 | Crawford et al. | |
| 5,406,479 A | 4/1995 | Harman | |
| 6,169,779 B1 | 1/2001 | Lai | |
| 6,359,956 B1 | 3/2002 | Hsieh et al. | |
| 6,411,670 B1* | 6/2002 | Besson | 378/4 |
| 8,116,426 B2 | 2/2012 | Hein et al. | |
| 2008/0095304 A1 | 4/2008 | Grass et al. | |
| 2009/0122955 A1* | 5/2009 | Bruder | 378/14 |
| 2009/0296880 A1* | 12/2009 | Beets et al. | 378/14 |

FOREIGN PATENT DOCUMENTS

JP    2012005757    1/2012

* cited by examiner

Primary Examiner — Hoon Song

(57) ABSTRACT

An image producing method is provided. The method includes acquiring regular-interval parallel-beam projection data whose intervals in a channel direction are the same and parallel to each other in a plurality of view directions by applying interpolation processing in a view direction, rearrangement processing, and interpolation processing in the channel direction to fan-beam projection data, and reconstructing an image by applying back projection processing to the acquired regular-interval parallel-beam projection data, wherein the interpolation processing in the view direction includes interpolation processing which is performed along a curve or a first straight line made by deforming or rotating a second straight line parallel to the view direction so as to be proximate to a trajectory drawn by dots corresponding to a desired position in a Scan Field Of View region on a sinogram of the collected fan-beam projection data in the plurality of views.

20 Claims, 14 Drawing Sheets

FAN BEAM GEOMETRY

PARALLEL GEOMETRY

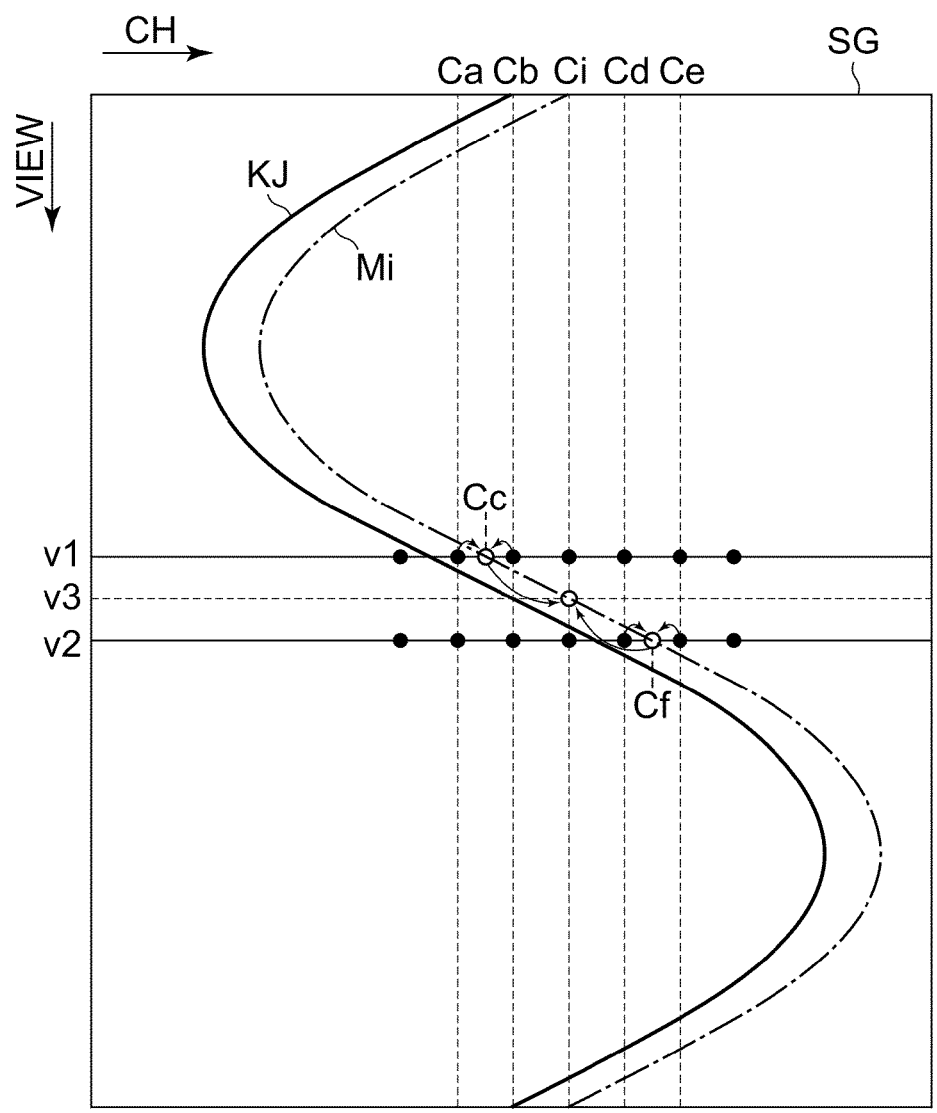

IMAGE PRODUCING METHOD, IMAGE PRODUCING APPARATUS AND RADIATION TOMOGRAPHIC IMAGING APPARATUS, AND PROGRAM

CROSS REFERENCE TO RELATED APPLICATIONS

This application claims the benefit of Japanese Patent Application No. 2012-139499 filed Jun. 21, 2012, which is hereby incorporated by reference in its entirety.

BACKGROUND OF THE INVENTION

The present invention relates to an image producing method for reconstructing an image by Fan-Para converting and back projecting radiation projection data, an image producing apparatus and a radiation tomographic imaging apparatus, and a program therefor.

In the third generation X-ray CT (Computed Tomography) apparatus, a fan-beam X-ray is used for collecting projection data. Also, there is a case where an image is reconstructed by performing back projection processing after converting the fan-beam projection data thus collected into parallel-beam projection data.

Generally, the above conversion is called "Fan-Para conversion," and the image reconstructing method using the Fan-Para conversion is called a "Fan-Para conversion method." The Fan-Para conversion method is applied mainly for the purpose of securing evenness of CT values, suppressing an artifact when performing MPR (Multi-Plane Reconstruction), and reducing the calculation amount, etc.

Incidentally, in the Fan-Para conversion method, Fourier transform which is frequency conversion, is performed on the projection data after the Fan-Para conversion. Therefore, the projection data after the Fan-Para conversion must be regular-interval parallel-beam projection data in which radiation paths corresponding to data of respective channels are correctly parallel to each other and are arranged at regular intervals in a channel direction (see, for example, paragraph [0004] etc. of Japanese Patent Application Laid-open No. 2012-005757).

Therefore, it is often the case in Fan-Para conversion that relatively high-precision regular-interval parallel-beam projection data is acquired by applying interpolation processing in a view direction, rearrangement processing, and interpolation processing in a channel direction to actually measured fan-beam projection data.

As compared with the data before the interpolation processing, however, the regular-interval parallel-beam projection data acquired by the interpolation processing contain more errors being different from the true value, which brings about degradation in spatial resolution in the reconstructed image. In particular, the degradation in spatial resolution grows more prominently as they become distant from the center, i.e., an iso-center, of a scan field of view region.

Under such circumstances, there is a demand for a technique capable of suppressing the degradation in spatial resolution of the reconstructed image even when the Fan-Para conversion is performed.

BRIEF DESCRIPTION OF THE INVENTION

According to the systems and methods described herein, in the Fan-Para conversion, interpolation processing is applied to fan-beam projection data in the view direction on the sinogram along a curve or a straight line made by deforming or rotating a straight line parallel to the view direction so as to be proximate to a trajectory drawn by dots corresponding to desired positions in the SFOV region. Therefore, when reconstructing an image in a region proximate to the above desired position, it is possible to suppress positional inconsistency, i.e., the profiles of the projection data acquired by the above interpolation becoming broad in the channel direction. Further, it is possible to perform adequate interpolation with less error and to suppress the degradation in spatial resolution in the image concerned even when the Fan-Para conversion is performed.

BRIEF DESCRIPTION OF THE DRAWINGS

FIG. 6 is an explanatory diagram illustrating a first method of interpolation processing in the view direction along a sinogram trajectory;

DETAILED DESCRIPTION OF THE INVENTION

Although embodiments of the present invention will be explained in detail below, the present invention is not limited to or by those embodiments.

Figure 1:
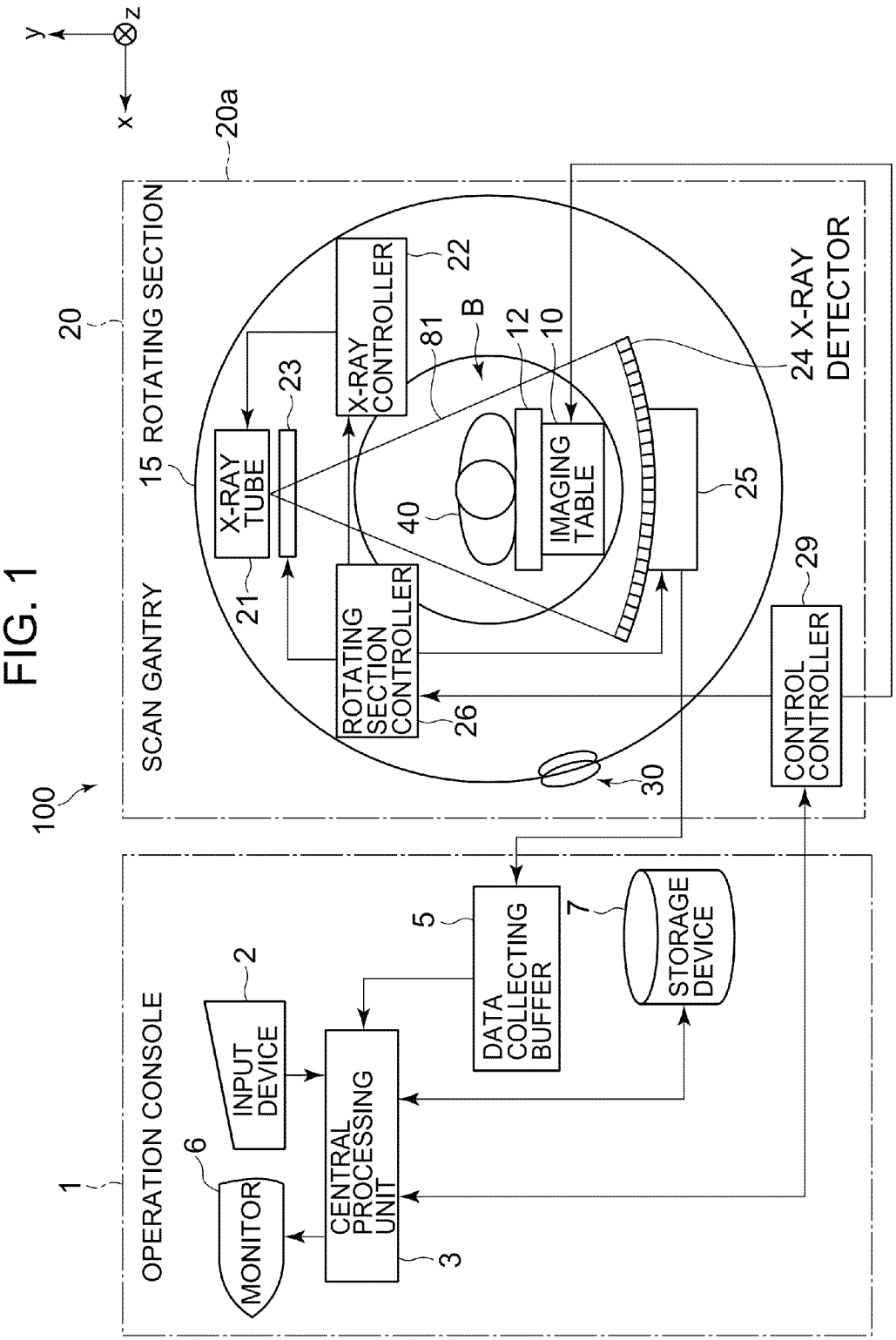
FIG. 1 is a diagram schematically showing the configuration of an X-ray CT apparatus according to the exemplary embodiment.

FIG. 1 schematically shows the configuration of the X-ray CT apparatus according to the exemplary embodiment.

The X-ray CT apparatus 100 includes an operation console 1, an imaging table 10, and a scan gantry 20.

The operation console 1 includes an input device 2 for accepting an input from an operator, a central processing unit 3 for controlling each section for imaging a subject and processing data for producing an image, a data collecting buffer 5 for collecting data acquired by the scan gantry 20, a monitor 6 on which an image is displayed, and a storage device 7 for storing programs and data, etc.

The imaging table 10 includes a cradle 12 which inserts a subject 40 into a bore B of the scan gantry 20 with the subject placed thereon. The cradle 12 is elevated and moved linearly and horizontally by a motor built in the imaging table 10. In this regard, a body axis direction of the subject 40, i.e., a direction in which the cradle 12 is moved linearly and horizontally is referred to as a "z direction", a vertical direction is referred to as a "y direction", and a horizontal direction orthogonal to the z and y directions is referred to as an "x direction."

The scan gantry 20 includes a rotatably supported rotating section 15. The rotating section 15 includes an X-ray tube 21, an X-ray controller 22 which controls the X-ray tube 21, an aperture 23 which shapes X-rays 81 emitted from the X-ray tube 21 into a fan-beam or a cone-beam, an X-ray detector 24 which detects X-rays 81 passing through the subject 40, a DAS 25 which collects output signals from the X-ray detector 24 as data, and a rotating section controller 26 which controls the X-ray controller 22 and the aperture 23. The main body of the scan gantry 20 includes a control controller 29 which swaps control signals etc. with the operation console 1 and the imaging table 10. The rotating section 15 and the main body of the scan gantry 20 are electrically connected through a slip ring 30.

The X-ray tube 21 and the X-ray detector 24 are positioned facing each other across an imaging space in which the subject 40 is placed, i.e., the bore B of the scan gantry 20. When the rotating section 15 rotates, the X-ray tube 21 and the X-ray detector 24 revolve around the subject 40 with their positional relationship maintained. The fan-beam or cone-beam X-rays 81 emitted from the X-ray tube 21 and shaped by the aperture 23 pass through the subject 40 and are irradiated to a detection plane of the X-ray detector 24.

In this regard, a spread direction of the fan-beam or cone-beam X-rays 81 in an x-y plane is called a channel direction (CH direction), a spread direction in the z direction or the z direction itself is called a slice direction (SL direction), and a direction toward a center of rotation of the rotating section 15 in the x-y plane is called an iso-center direction (I direction).

The X-ray detector 24 has a plurality of X-ray detector elements 24$i$ arranged in the channel direction and the slice direction. In addition, the number of the detector elements in the channel direction is, for example, about 900 in an angle range of 60 degrees, and its arrangement interval is, for example, about 1 mm.

Figure 2:
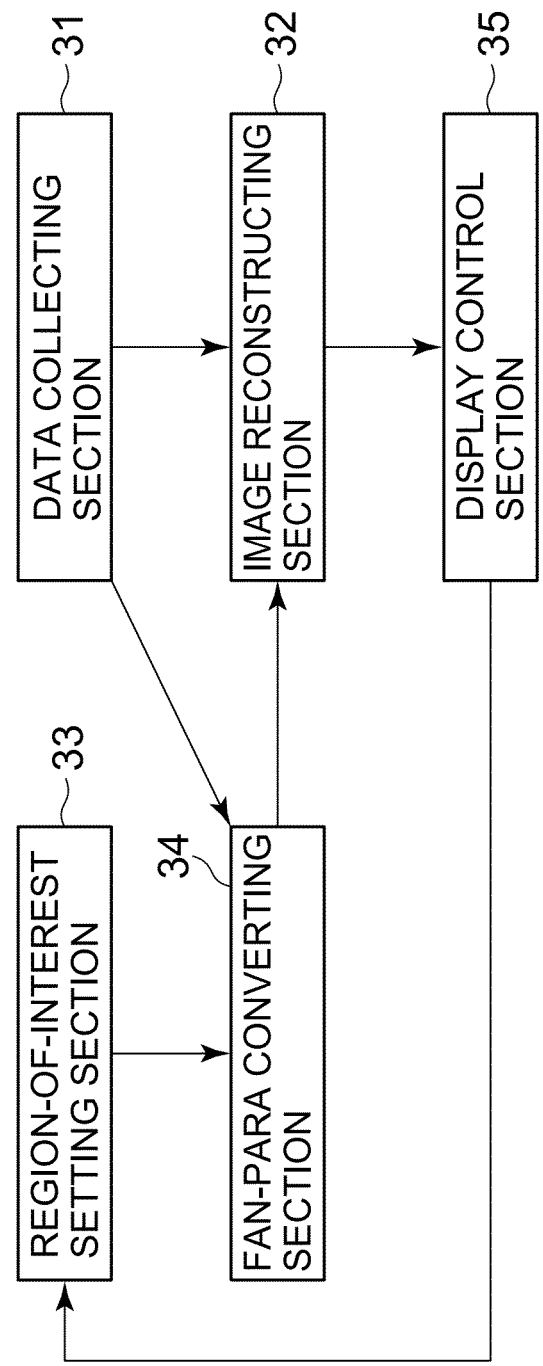
FIG. 2 is a functional block diagram showing the configuration of portions related to image producing processing in the X-ray CT apparatus.

FIG. 2 is a functional block diagram showing the configuration of portions related to image producing processing in the X-ray CT apparatus. As shown in FIG. 2, the X-ray CT apparatus 100 includes a data collecting section 31, an image reconstructing section 32, a region-of-interest setting section 33, a Fan-Para converting section 34, and a display control section 35.

The function of each section will be described in detail.

Figure 3:
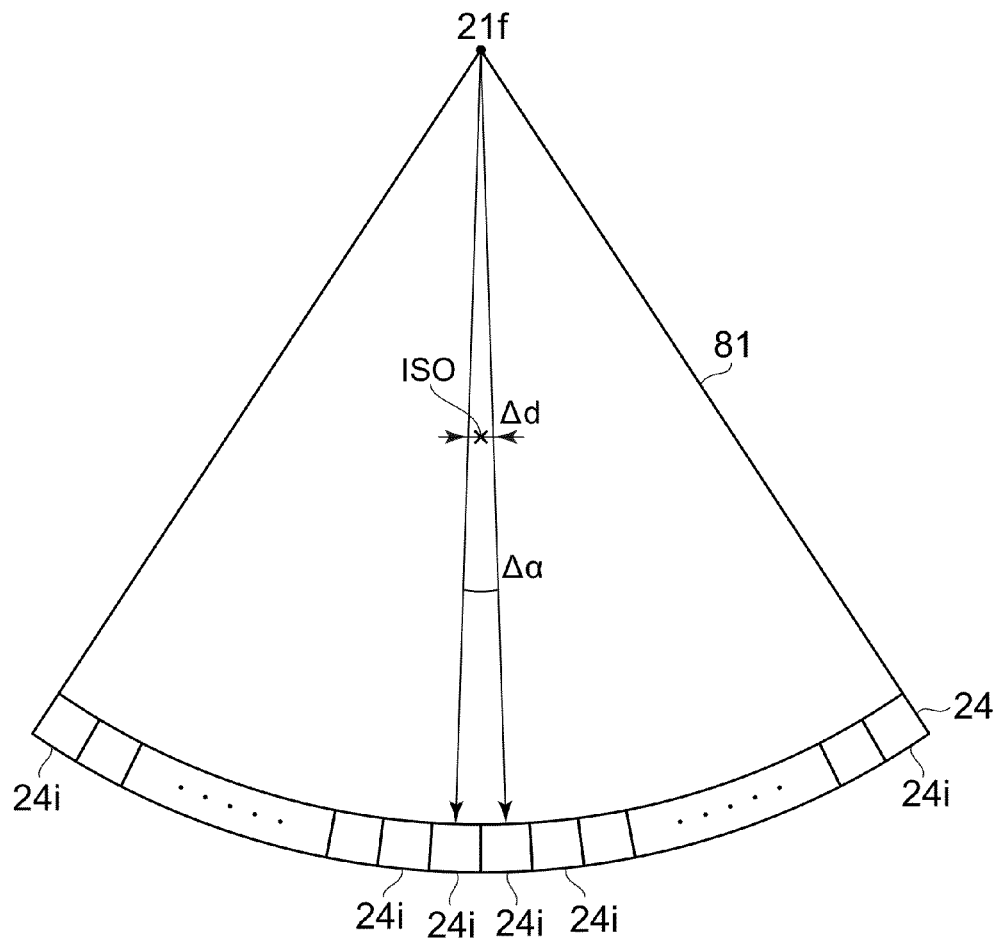
FIG. 3 shows a geometrical layout during the data collection.

FIG. 3 shows the geometrical layout during the data collection.

The data collecting section 31 controls the imaging table 10 and the scan gantry 20 to perform a scan and collects fan-beam projection data in a plurality of views. The fan-beam projection data is projection data in which the X-ray paths corresponding to data of channels spread in the shape of a fan-beam, i.e., radially in a predetermined angle range from an X-ray focal point.

According to the present example, as shown in FIG. 3, the above scan is performed in such a way that a predetermined number of views are evenly assigned to a rotational angle of one turn so that a rotational angle corresponding to one view may be substantially equal to a rotational angle $\Delta\alpha$ corresponding to an arrangement interval of the detector elements in the channel direction. Further, according to the present example, the number of views for collecting actual data to be assigned to the rotational angle of one turn is, for example, about 1000.

The image reconstructing section 32 applies image reconstructing processing to projection data in the plurality of views collected by the data collecting section 31 and reconstructs images in a whole Scan Field of View (SFOV) region. As the image reconstructing processing, for example, a three-dimensional back projection processing represented by Feldkamp method etc. can be employed. Moreover, the image reconstructing section 32 reconstructs an image in a region of interest set by the region-of-interest setting section 33 by applying back projection processing to the regular-interval parallel-beam projection data in the plurality of view directions acquired by the Fan-Para converting section 34. As the back projection processing, for example, a filtered back-projection process, a convolution back-projection process, etc. can be employed. The filtered back-projection process is the one which reconstructs an image by multiplying Fourier transform of the projection data by a reconstruction function (filter function) in a frequency space and by performing reverse Fourier transform. Also, the convolution back-projection process is the one which reconstructs an image by working out reverse Fourier transform of the reconstruction function and by superposing it on the projection data or performing convolution and back projection processing in the actual space.

According to the operation of the operator, the region-of-interest setting section 33 sets a region of interest in the SFOV region. For example, on a screen where images of the whole SFOV region reconstructed by the image reconstructing section 32 are shown, the operator specifies a region to be observed closely, i.e., a region to be enlarged and observed with use of GUI (Graphical User Interface). The region-of-interest setting section 33 sets the specified region as a region of interest.

The display control section 35 displays, on the screen, the images in the SFOV region and the region of interest reconstructed by the image reconstructing section 32.

Figure 4B:
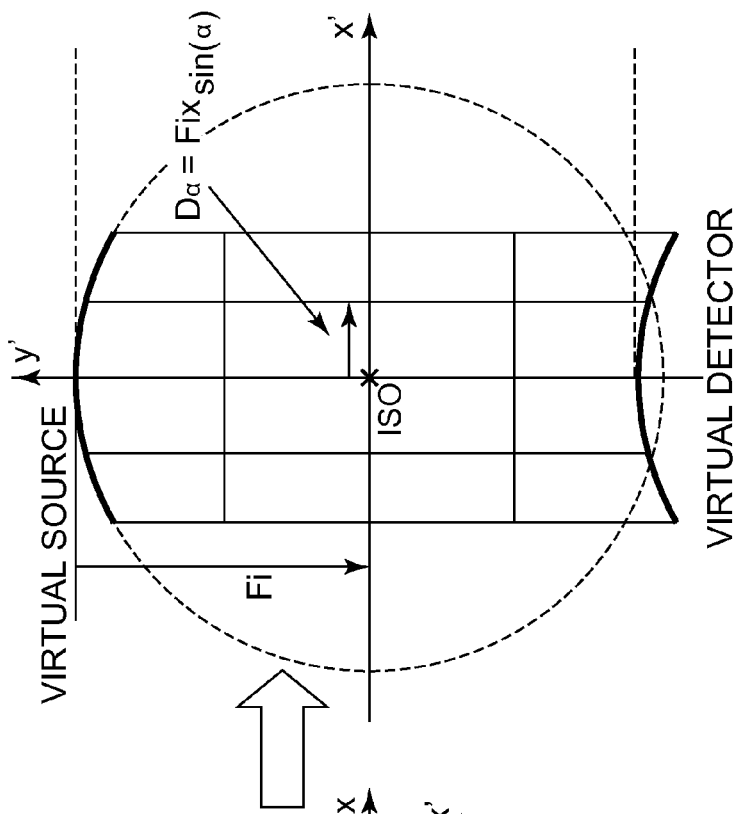
FIGS. 4A and 4B show a geometrical layout during the Fan-Para conversion.
Figure 4A:
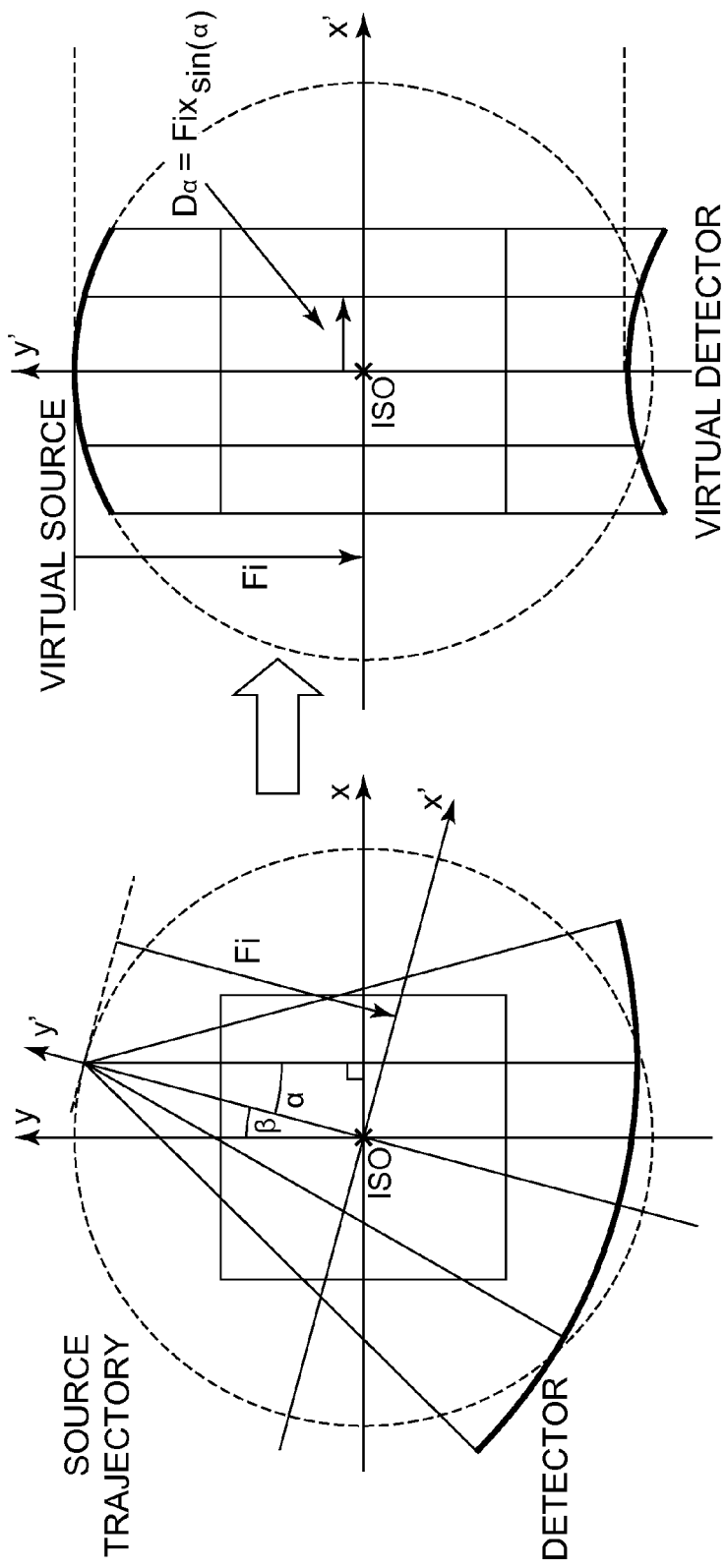

FIGS. 4A and 4B show the geometrical layout during the Fan-Para conversion. FIG. 4A shows a fan-beam geometry and FIG. 4B shows a parallel-beam geometry.

The Fan-Para converting section 34 acquires regular-interval parallel-beam projection data in the plurality of views by applying interpolation processing in the view direction, rearrangement processing, and interpolation processing in the channel direction to the fan-beam projection data in the plurality of views collected by the data collecting section 31.

First, the interpolation processing in the view direction will be described. The interpolation processing in the view direction is for acquiring parallel projection data in which X-ray paths of data in respective channels are parallel to each other when rearrangement processing to be described later is performed.

Figure 5A:
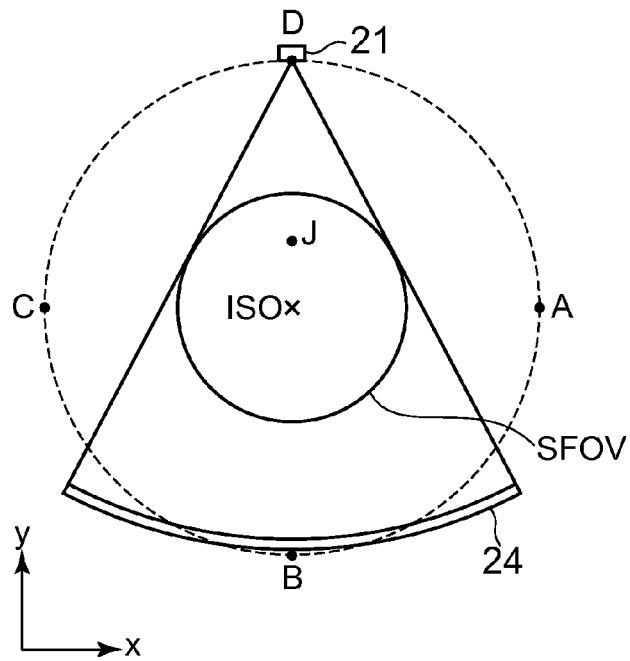
FIGS. 5A and 5B are explanatory diagrams illustrating a principle of occurrence of positional inconsistence caused by the interpolation processing in the view direction according to the conventional method.
Figure 5B:
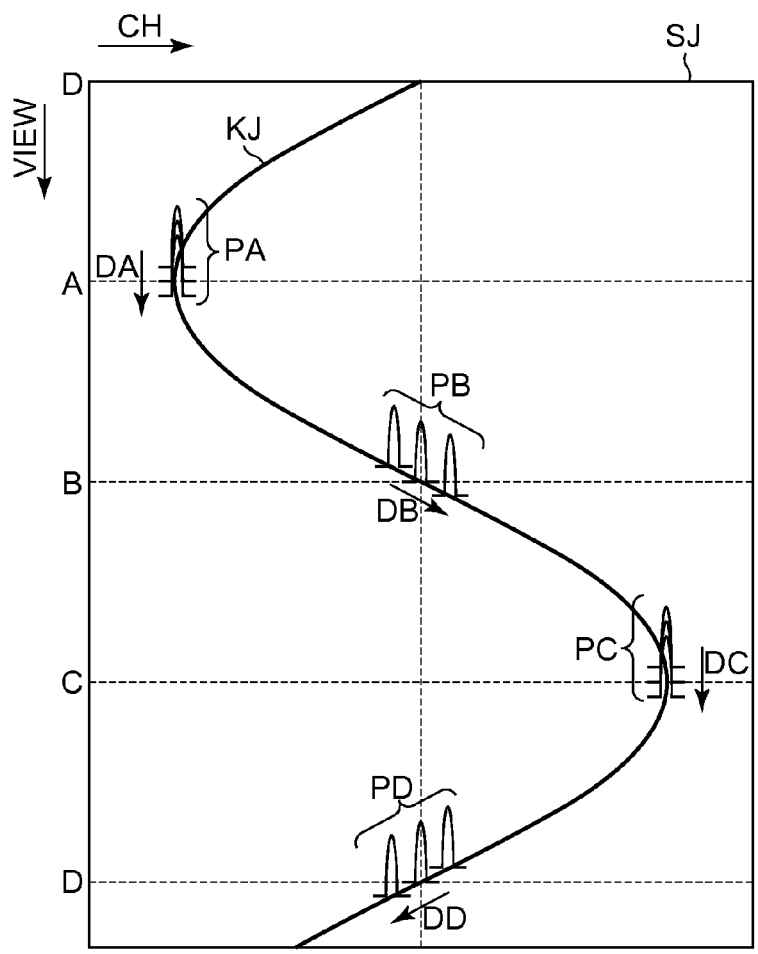

FIGS. 5A and 5B are explanatory diagrams showing a sinogram SG of the object J at a position distant from the iso-center ISO being a center of rotation of the rotating section 15. The sinogram shows output profiles from the X-ray detector in each view (projection angle position) collected at the time of a scan. The profiles are shown in time series with output data of each channel of the X-ray detector 24 being exhibited by brightness indication. Generally, on the sinogram, a horizontal axis represents a channel (number) and a vertical axis represents a view (number). In addition, in this example, a micro-sphere is assumed as an object J.

As shown in FIG. 5A, the object J is located on an upper side (+y direction) of the iso-center ISO. When the scan is performed such that the X-ray tube 21 rotates once passing positions D, A, B, C, and D, in this order, a sinogram SG as shown in FIG. 5B is acquired. On this sinogram SG, a trajectory KJ of dots (signals) corresponding to the object J is drawn in the shape of an S character. At this time, output profiles of the X-ray detector 24 when the X-ray tube 21 is near positions A, B, C, or D are shown in a state of being superposed on the trajectory by three views each. PA, PB, PC, and PD are the output profiles of three views corresponding to the positions A, B, C, and D. In this regard, when the X-ray tube 21 is near the position A and the position C, the position corresponding to the object J on the sinogram SG is located at an inflection point of the channel on the X-ray detector 24 where the channel number becomes smallest or largest. Therefore, as shown by DA and DC, respectively, the directions along the trajectory KJ at this position are substantially parallel in the view direction. That is, they are substantially orthogonal to the channel direction, and the profiles of the three views are substantially superposed in the channel direction. On the other hand, when the X-ray tube 21 is near the position B and the position D, the position corresponding to the object J on the sinogram SG is located near the center of the X-ray detector 24, which is on a route from the channel where the channel number is smallest or largest to the opposite side. Therefore, as shown by DB and DD, respectively, the direction along the trajectory KJ at this position is tilted greatly from the view direction. Accordingly, in terms of positions in the channel direction, there occur relatively large shifts in the profiles of those three views. In such a case, when interpolation processing is performed, as in the past, between the data having the same channel number in the view direction, the data after the interpolation is calculated using the profiles as they are whose positional inconsistency in the channel direction is relatively large. Consequently, the data after the interpolation processing becomes a broad profile, losing spatial resolution as a result.

Therefore, according to the exemplary embodiment, when interpolation processing is performed in the view direction, the direction in which the interpolation processing is performed is adjusted so that the data after the interpolation processing may not be a broad profile in the channel direction as above. That is, a desired position is assumed in the SFOV region. Then, a sinogram during a micro-sphere placed at the desired position being scanned is worked out. Furthermore, on the sinogram, a trajectory that the dots (profiles) corresponding to the above object draw in the view direction is found. Then, with respect to the fan-beam projection data of respective views used for the image reconstruction in the region near the above desired position, the interpolation processing of the view direction is performed in the direction along the above trajectory. In this regard, on the sinogram where the object in the SFOV region is scanned, the trajectory drawn by the dots (profiles) corresponding to the object is called a "sinogram trajectory."

Conventionally, when the number of samplings by the DAS 25 is increased and the number of views for one turn of the gantry is increased, the spatial resolution is improved around the SFOV region. Therefore, it is commonly understood that the periphery thereof is short of view density, which is in fact wrong. In reality, when the number of views for one turn of the gantry is increased, the distance between the views becomes shorter. Accordingly, when the interpolation processing in the view direction is performed, the positional inconsistency that the profiles of the fan-beam projection data grow broad in the channel direction becomes small. As a result, the spatial resolution near the periphery of the SFOV region has been improved. That is, even if the number of views for one turn of the gantry is not increased, the spatial resolution can be improved by performing the interpolation processing of the view direction in a correct direction, i.e., in the direction along the sinogram trajectory.

In this regard, as an example of the interpolation processing in the view direction along the sinogram trajectory, two methods will be explained.

Now, a first method of the interpolation processing in the view direction along the sinogram trajectory will be explained. FIG. 6 is an explanatory view illustrating the first method of the interpolation processing in the view direction along the sinogram trajectory.

As shown in FIG. 6, the sinogram SG includes fan-beam projection data of an actually measured first view V1, and fan-beam projection data of an actually measured second view V2. The first View V1 and the second view V2 are next to each other in the view direction.

Let us assume a virtual third view V3 between the first view V1 and the second view V2 and consider calculating fan-beam projection data of the third view V3 by interpolating the fan-beam projection data of the actually measured first view V1 and the second view V2. On the sinogram SG in FIG. 6, black dots represent actually measured data of channels and white dots represent data of virtual channels, respectively.

First, attention is directed to a channel Ci of fan-beam projection data in the third view V3. On the sinogram SG, there is specified a sinogram trajectory KJ of a point corresponding to a typical position in the region of interest set in the SFOV region. According to the present example, a typical position in the region of interest is a center of the region of interest.

Next, there is assumed a curve Mi being parallel to the sinogram trajectory KJ in the channel direction and passing through a channel Ci. Data in the virtual channel on the curve Mi is calculated by interpolating data of channels in a plurality of measured views near the third view V3. According to the present example, there is calculated data of a virtual channel Cc on the curve Mi in the first view V1 according to interpolation processing using data of channels Ca and Cb in the first view V1. Also, there is calculated data of a virtual channel Cf on the curve Mi in the second view V2 according to interpolation processing using data of channels Cd and Ce in the second view V2.

Then, by the interpolation processing using the previously calculated data in the virtual channel on the curve Mi, data of the channel Ci in the virtual third view V3 is calculated. In this example, the data of the channel Ci in the third view V3 is calculated by interpolating the data of the channel Cc in the first view V1 and the data of the channel Cf in the second view V2.

Figure 7:
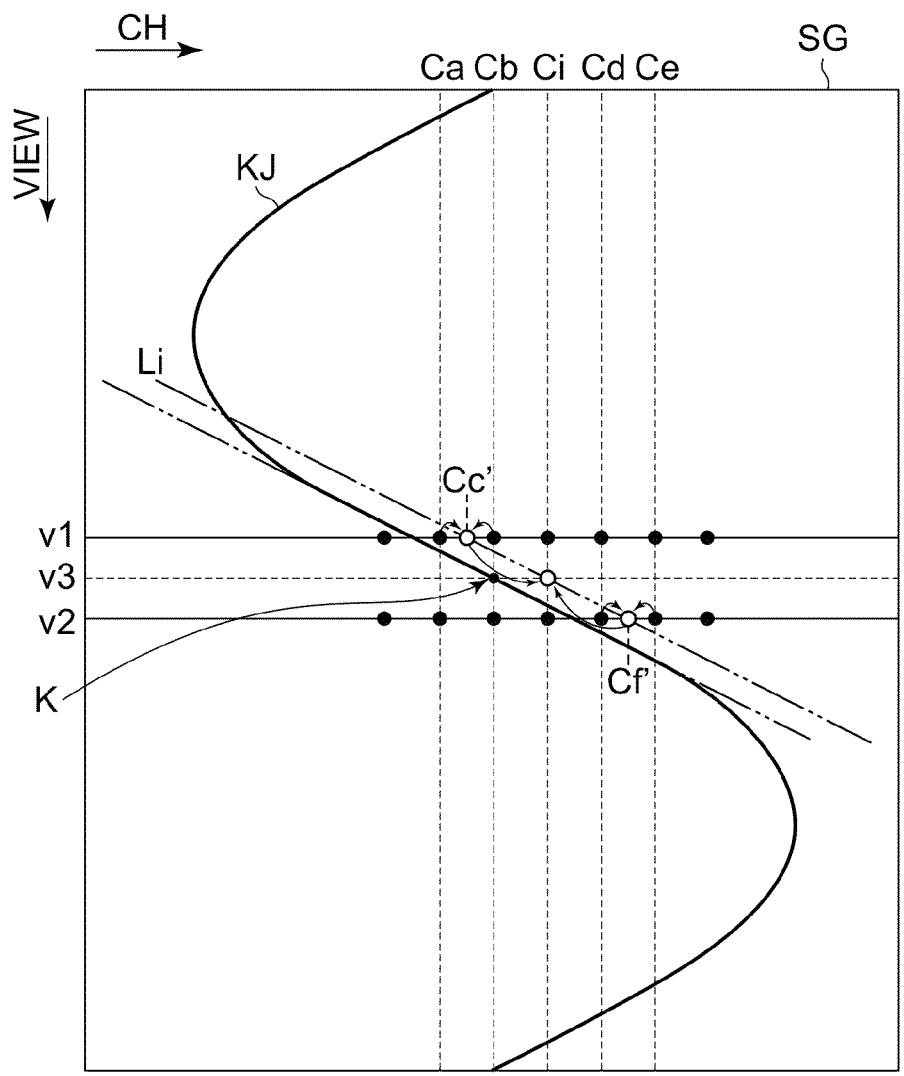
FIG. 7 is an explanatory diagram illustrating a second method of interpolation processing in the view direction along the sinogram trajectory.

Next, there is explained a second method of interpolation in the view direction along the sinogram trajectory. FIG. 7 is an explanatory view illustrating a second method for the interpolation processing in the view direction along the sinogram trajectory.

As shown in FIG. 7, the sinogram SG includes fan-beam projection data of the measured first view V1 and fan-beam projection data of the measured second view V2. The first view V1 and the second view V2 are next to each other in the view direction.

As in the first method, let us assume a virtual third view V3 between the first view V1 and the second view V2, and consider calculating fan-beam projection data of the third view V3 by interpolating the fan-beam projection data of the measured first view V1 and the second view V2. In the sinogram SG of FIG. 7, black dots represent measured data of the channel and white dots represent data of the virtual channel, respectively.

First, attention is directed to a channel Ci of fan-beam projection data in the third view V3. On the sinogram SG, there is specified a sinogram trajectory KJ of a point corresponding to a typical position in a region of interest set in the SFOV region. According to the present example, the typical position of the region of interest is a center of the region of interest. A position K corresponding to the third view V3 in the specified sinogram trajectory KJ is specified.

Next, at a position K on the sinogram trajectory KJ, there is assumed a straight line Li being parallel to a tangent thereto and passing through the channel Ci. There is calculated data of a virtual channel on the straight line Li by interpolating data in the channels of the plurality of measured views proximate to the third view V3. According to the present example, by interpolation processing using the data of the channels Ca and Cb in the first view V1, data of a virtual channel Cc' on the straight line Li in the first view V1 is calculated. Further, by interpolation processing using the data of the channels Cd and Ce in the second view V2, data of a virtual channel Cf on the straight line Li in the second view V2 is calculated.

Then, by the interpolation processing using previously found data of the virtual channel on the straight line Li, data of the channel Ci in the third view V3 is calculated. According to the present example, the data of the channel Ci in the third view V3 is calculated by the interpolation processing of the data of the channel Cc' in the first view V1 and the data of the channel Cf in the second view V2.

In addition, linear interpolation processing (primary interpolation) can be considered as the interpolation here. However, three or more data items of the virtual channel may be calculated and the data of the channel Ci of the virtual third view V3 may be calculated by a multi-dimensional interpolation using those. As the multi-dimension interpolation, for example, spline interpolation, Lagrange interpolation, Newton interpolation, bi-linear interpolation, etc. can be employed.

Moreover, the sinogram trajectory is similar to a curve expressed by trigonometric functions such as $\sin\theta$ or $\cos\theta$. Therefore, in place of the sinogram trajectory KJ, a curve of a trigonometric function proximate to it may be found and used.

With respect to each channel Ci in the virtual third view V3, such interpolation processing of the view direction in the direction along the sinogram trajectory is performed. Consequently, the whole fan-beam projection data in the third view V3 is calculated. Moreover, with respect to each virtual view requiring interpolation, the processing similar to the processing for calculating the fan-beam projection data in the third view V3 is performed. Consequently, the interpolation processing in the view direction along the sinogram trajectory is applied to the whole fan-beam projection data in the plurality of views.

Also, according to the present example, the data of the virtual view is calculated by interpolating the data of two measured views proximate to the virtual view. Of course, the data may be calculated by interpolating data of three or more measured views proximate to the virtual view. However, in this case also, data of the virtual channel on the above curve Mi or the straight line Li is first calculated and, then, the interpolation processing thereof is performed.

Incidentally, it is clear that the sinogram trajectory varies according to the position of its object. Therefore, when trying to improve, as a whole, the spatial resolution in the reconstructed image in the SFOV region by performing the interpolation in the view direction along the sinogram trajectory, it is necessary to perform, for each local region, the interpolation processing in the view direction of the fan-beam projection data to be used for the image reconstruction in the local region along the sinogram trajectory of the object located in the local region. Otherwise, inconsistency in the fan-beam projection data becomes rather large, degrading the image quality of the reconstructed image.

However, when the sinogram trajectory to be applied is changed and the interpolation processing of the view direction and the image reconstruction is performed for each local region, the amount of calculation grows enormously. Moreover, in reality, it is often the case that only some part of the SFOV region is a region of interest and it serves the purpose if at least an image of such part of the region is reconstructed with high spatial resolution.

Therefore, according to the exemplary embodiment, there is assumed a micro-sphere existing at a typical position in the region of interest set in the SFOV region, and the interpolation processing of the view direction of the fan-beam projection data is performed in the direction along a sinogram trajectory of this object.

Figure 8A:
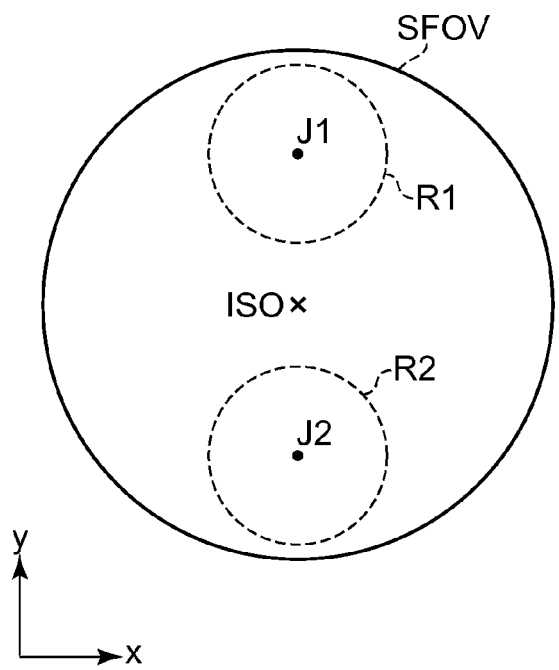
FIGS. 8A and 8B are explanatory diagrams illustrating an effect of suppressing positional inconsistency when the interpolation processing in the view direction is evenly performed along the sinogram trajectory of an object at a particular position.
Figure 8B:
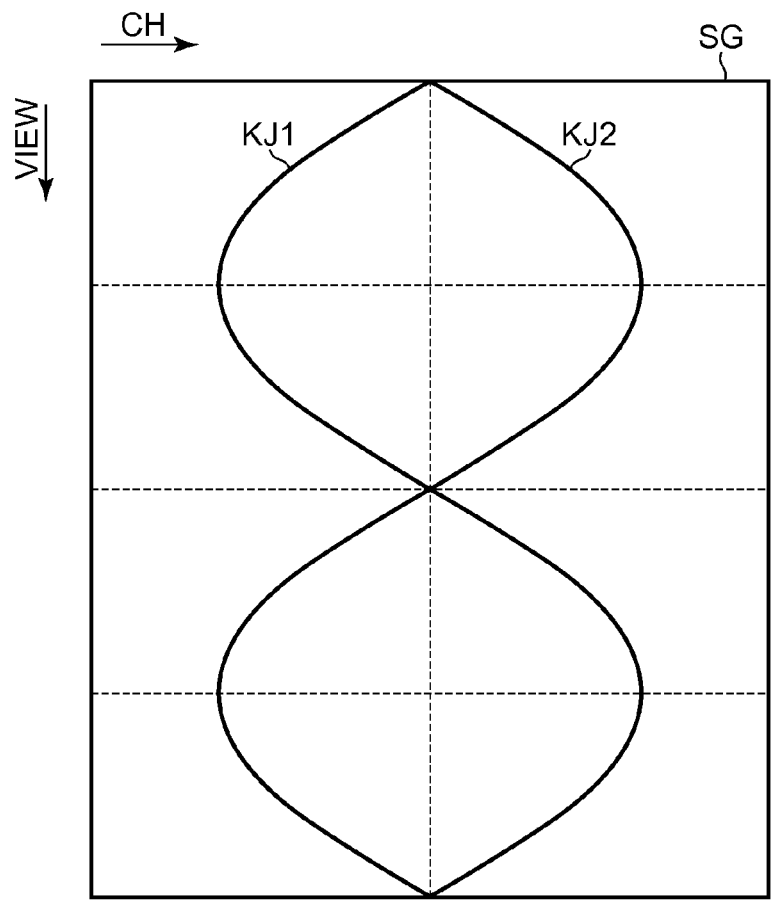

For example, as shown in FIGS. 8A and 8B, in the SFOV region, when a first local region R1 is a region of interest, the interpolation processing of the view direction is performed along a sinogram trajectory KJ1 of a first object J1 existing at a typical position in the first local region R1. In this case, proper interpolation is not performed in a second local region R2 being distant from the first local region R1. However, since the second local region R2 is not a region of interest or, as the case may be, the first local region R1 alone is visualized and the second local region R2 is not visualized, and such inconsistency is not noticed easily. On the contrary, when the second local region R2 is a region of interest, the interpolation of the view direction is performed along the sinogram trajectory KJ2 of the second object J2 existing at the typical position in the second local region R2. In this case, in the first local region R1 distant from the second local region R2, proper interpolation is not performed. The first local region R1 is not, however, a region of interest. Alternatively, as the case may be, the second local region R2 alone is visualized and the first local region R1 is not visualized. Therefore, such inconsistency is not easily noticed.

Further, when the region of interest is large and the above inconsistency becomes prominent by evenly performing the interpolation of the view direction along the specific sinogram trajectory, a conventional method can be employed.

Rearrangement processing will be described now. The rearrangement processing is performed by putting fan-beam projection data (including actually measured data) of a plurality of views acquired by the interpolation processing in the view direction along the sinogram trajectory into data of each channel and rearranging them. As a result, parallel-beam projection data whose X-ray paths are parallel to the plurality of view directions are acquired.

As shown in FIG. 4, in the parallel-beam projection data acquired after the rearrangement processing, a distance Da from an iso-center ISO of an X-ray path corresponding to data of each channel is expressed by: $D\alpha = Fi \times \sin(\alpha)$, where Fi is a distance between an X-ray focal point and the iso-center ISO and a is a rotational angle of a detector element 24$i$. That is, the parallel-beam projection data acquired after the rearrangement are irregular-interval parallel-beam projection data where X-ray paths corresponding to data of respective channels are arranged at irregular intervals in the channel direction.

The scan by the data collecting section 31 is, as described above, performed as follows. That is, a predetermined number of views are evenly assigned to the rotational angle of one turn such that the rotational angle corresponding to one view is substantially equal to the rotational angle $\Delta\alpha$ corresponding to an arrangement interval in the channel direction of the detector elements 24$i$. Accordingly, an interval in the channel direction of the X-ray paths in the irregular-interval parallel-beam projection data becomes as follows. That is, the interval of the X-ray paths of irregular-interval parallel-beam projection data in the channel direction becomes an interval $\Delta d$ acquired near the iso-center ISO by dividing the arrangement interval of the detector elements 24$i$ of the X-ray detector 24 in the channel direction by a projection enlarging rate (also called an "X-ray enlarging rate") in the detection plane with the iso-center ISO being a reference. That is, as shown in FIG. 3, when assuming a straight line from an X-ray focal point 21$f$ through a neighborhood of the iso-center ISO to a center of one detector element 24$i$ and a straight line from the X-ray focal point 21$f$ to the center of a detector element 24$i$ next to the detector element 24$i$, the interval $\Delta d$ corresponds to a distance between the two straight lines near the iso-center ISO. When seeing geometrically, the spatial resolution in the reconstructed image cannot be raised more than the interval $\Delta d$. Therefore, the interval $\Delta d$ is considered as a threshold for raising the spatial resolution in the reconstructed image to the maximum. The interval $\Delta d$ is referred to as a "reference interval" here. Further, when the arrangement interval of the detector elements in the channel direction is about 1 mm, the reference interval $\Delta d$ is, for example, about 0.5 mm.

Next, the interpolation processing in the channel direction will be described. The interpolation processing in the channel direction is for acquiring regular-interval parallel-beam projection data in which X-ray paths corresponding to respective data are arranged being parallel to each other and at regular intervals in the channel direction by applying interpolation processing to irregular-interval parallel-beam projection data acquired by interpolation processing in the view direction and rearrangement processing. Also, in the interpolation processing in the channel direction, a position of the X-ray path in the regular-interval parallel-beam projection data is so set as to substantially superpose on an X-ray path in the regular-interval parallel-beam projection data near the iso-center.

With regard to the interpolation processing in the channel direction, a description will be given comparing conventional method with a method according to the exemplary embodiment.

Figure 9:
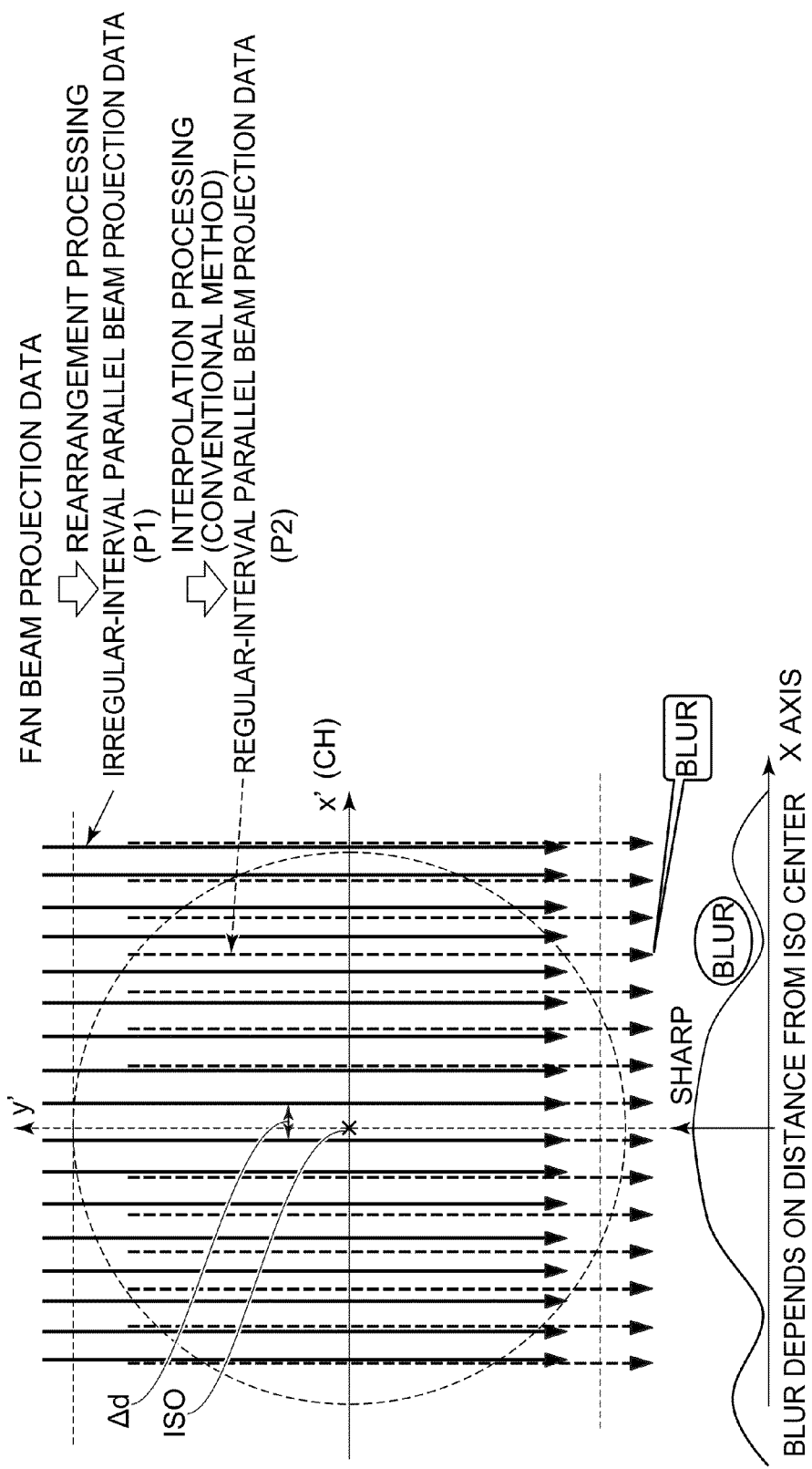
FIG. 9 is an explanatory diagram illustrating interpolation processing of parallel-beam projection data in the channel direction according to the conventional method.

FIG. 9 is an explanatory diagram illustrating the interpolation processing in the channel direction according to the conventional method. Upper arrows (Non-normalized Fan Data) in FIG. 9 represent X-ray paths in the irregular-interval parallel-beam projection data P1 in a simplified manner. Further, lower arrows (Normalized Fan Data) in FIG. 9 represent, in a simplified manner, X-ray paths in the regular-interval parallel-beam projection data P2 after the interpolation processing according to the conventional method.

In the conventional method, as shown in FIG. 9, the interval of the X-ray paths in the channel direction in the regular-interval parallel-beam projection data P2 is so set as to be substantially equal to the reference interval $\Delta d$. That is, the setting of the interval of the X-ray paths of the regular-interval parallel-beam projection data P2 to be acquired, i.e., the sampling interval in the channel direction has already reached an upper limit where the spatial resolution in the reconstructed image can be enhanced most. Therefore, such a setting is made that further minute sampling does not contribute to improvement in spatial resolution, only increasing the amount of calculation.

The difference between the interval of X-ray paths in the irregular-interval parallel-beam projection data P1 and the interval of X-ray paths in the regular-interval parallel-beam projection data P2 is actually very small. However, the spatial relationship of X-ray paths in the irregular-interval parallel-beam projection data P1 and the X-ray paths in the regular-interval parallel-beam projection data P2 is consistent near the iso-center ISO and gradually becomes inconsistent in portions being distant from the iso-center ISO. As the distance from the iso-center ISO becomes longer, the small shifts are gradually piled up to reach a maximum point at a certain position. In the periphery of the maximum point, information required to maintain spatial resolution is lost. After passing the maximum point, the positional shift of the X-ray paths gradually reduces and, at a certain point, the shift disappears and the X-ray paths match with each other. After that, the shift gradually grows and reaches the maximum point again.

Thus, the spatial resolution, for example, MTF (Modulation Transfer Function) being an index thereof, is lowered periodically in accordance with the distance from the iso-center ISO.

Figure 10A:
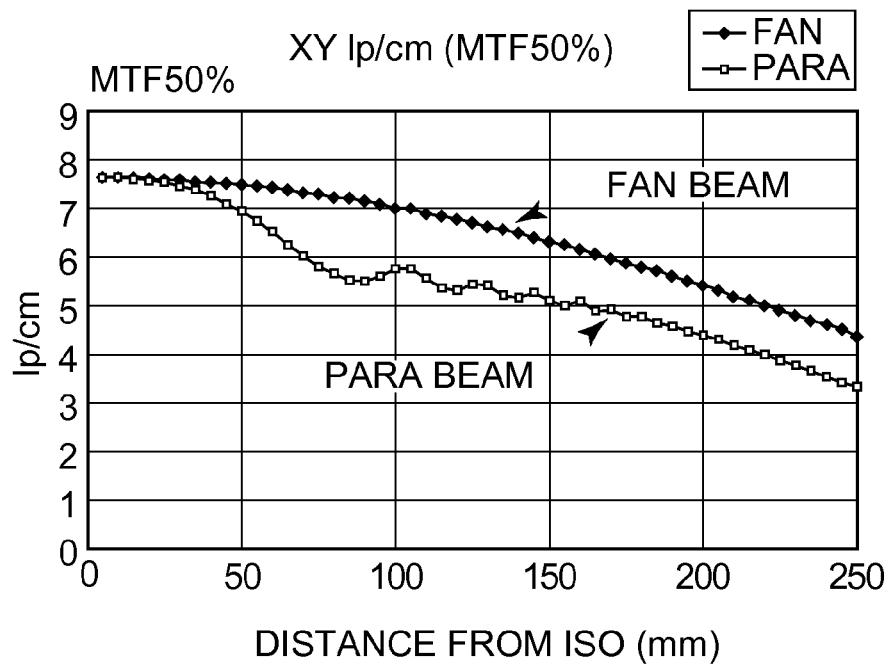
FIGS. 10A and 10B are graphs which show how the spatial resolution varies as the distance from an iso-center in the reconstructed image changes according to the conventional method and is worked out by simulation.
Figure 10B:
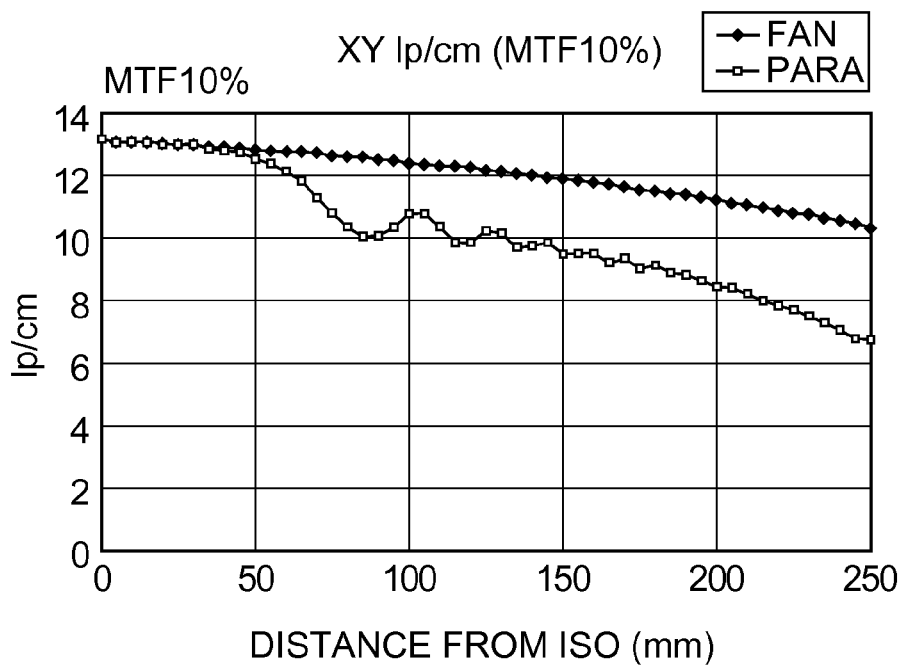

FIGS. 10A and 10B show graphs illustrating variation in spatial resolution according to the distance from the iso-center ISO in the reconstructed image made by the conventional method, and is acquired by simulation. The graph in FIG. 10A is made by calculating the line pair number per 1 cm when the MTF value is 50% at each position on the image and plotting them. Further, the graph in FIG. 10B is made by calculating the line pair number per 1 cm when the MTF value becomes 10% at each position on the image and plotting them. For reference, in either of the graphs, there is shown a variation curve of the spatial resolution in the reconstructed image based on the fan-beam projection data. In these graphs also, in the reconstructed image according to the conventional method, there is observed a state where the spatial resolution falls periodically according to the distance from the iso-center ISO.

In the case of the conventional method, the positional shift amount between the X-ray paths in the irregular-interval parallel-beam projection data and the X-ray paths in the regular-interval parallel-beam projection data partially grows, degrading the spatial resolution in its vicinity.

Figure 11:
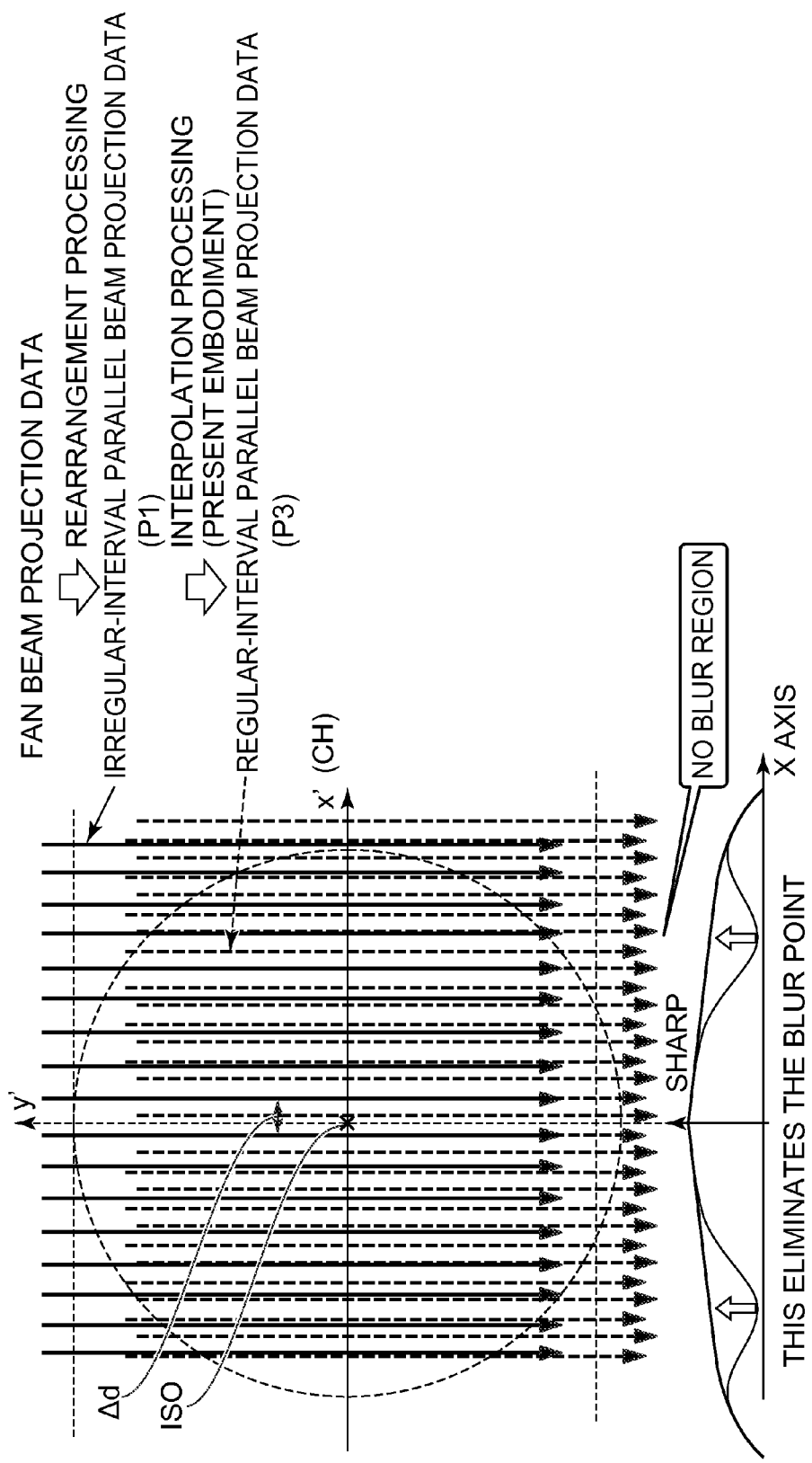
FIG. 11 is an explanatory diagram illustrating interpolation processing of parallel-beam projection data in the channel direction according to the exemplary embodiment.

FIG. 11 is an explanatory diagram illustrating interpolation processing in the channel direction according to the exemplary embodiment. Upper arrows in FIG. 11 represent X-ray paths in the irregular-interval parallel-beam projection data P1 in a simplified manner. Also, lower arrows in FIG. 11 represent, in a simplified manner, X-ray paths in the regular-interval parallel-beam projection data P3 after the interpolation processing.

According to the method of the exemplary embodiment, as shown in FIG. 11, an interval of the X-ray paths of the regular-interval parallel-beam projection data P3 in the channel direction is so set as to be smaller than the reference interval $\Delta d$. Further, the interval is so set as to be substantially equal to 1/N (N is an integer of two or larger) of the reference interval $\Delta d$.

Even in this way, it appears that the method does not contribute to an improvement in spatial resolution. However, in fact, when the interval of the X-ray paths in the channel direction in the regular-interval parallel-beam projection data P3 is allowed to be smaller than the reference interval $\Delta d$, it becomes possible for the opportunity to be increased where the back projection processing can use the reliable data before the interpolation, i.e., the data itself in the irregular-interval parallel-beam projection data P1, or the data after the interpolation being close to the former data, which makes it possible to suppress the degradation in spatial resolution in the reconstructed image.

In addition, when the interval of the X-ray paths in the channel direction in the regular-interval parallel-beam projection data P3 is set to 1/N (N is an integer of two or larger) of the reference interval $\Delta d$, it becomes possible to include, in the regular-interval parallel-beam projection data P3, more of the data itself in the irregular-interval parallel-beam projection data P1 or the data close to it, further suppressing the degradation in spatial resolution in the reconstructed image.

Also, the greater the above integer N is, the more effective the suppression of the degradation in spatial resolution becomes. However, while its effect gradually hits the ceiling, the amount of calculation continues to increase. Therefore, considering the balance of the effect and the calculation amount, as setting for the time being, in the exemplary embodiment, N is from two to four.

As the above interpolation processing, other than linear interpolation (primary interpolation), for example, multi-dimensional interpolation such as spline interpolation, Lagrange interpolation, Newton interpolation, and bi-linear interpolation can be used.

When using the multi-dimensional interpolation as the interpolation processing described above, the degree of the interpolation processing may vary according to the distance from the iso-center ISO of the X-ray paths corresponding to data to be acquired by such interpolation processing. For example, when the distance is short, the degree of the interpolation processing may be allowed to be small. Alternatively, as the distance becomes longer, the degree of the interpolation may be allowed to be greater. In this way, it is possible to apply interpolation processing which is appropriate according to the high/low tendency of the spatial resolution in a radial direction from the center corresponding to the iso-center ISO in a reconstructed image, further suppressing the degradation in spatial resolution.

Moreover, the weighting to the original data to be used for interpolation processing may be changed according to the distance between the X-ray path corresponding to the data to be acquired by the interpolation processing and the X-ray path corresponding to the original data to be used for the interpolation processing. That is, a non-linear property may be imparted to the weighting. For example, when the distance is short, the weight may be allowed to be greater. Alternatively, when the distance is longer, the weight may be allowed to be smaller. In this way, when it is judged that the X-ray path corresponding to data after the interpolation processing is close enough to the X-ray path corresponding to the original data used for the interpolation processing, it becomes possible to acquire data closer to the actual data by allowing the weighting to the original data to be greater than the one in the case of the linear interpolation, further suppressing the degradation in spatial resolution.

Moreover, interpolation processing in the view direction, rearrangement processing, and interpolation processing in the channel direction may be, on algorithm, performed step by step separately. Alternatively, they may be performed collectively.

A flow of image producing processing in the X-ray CT apparatus according to the exemplary embodiment will be explained.

Figure 12:
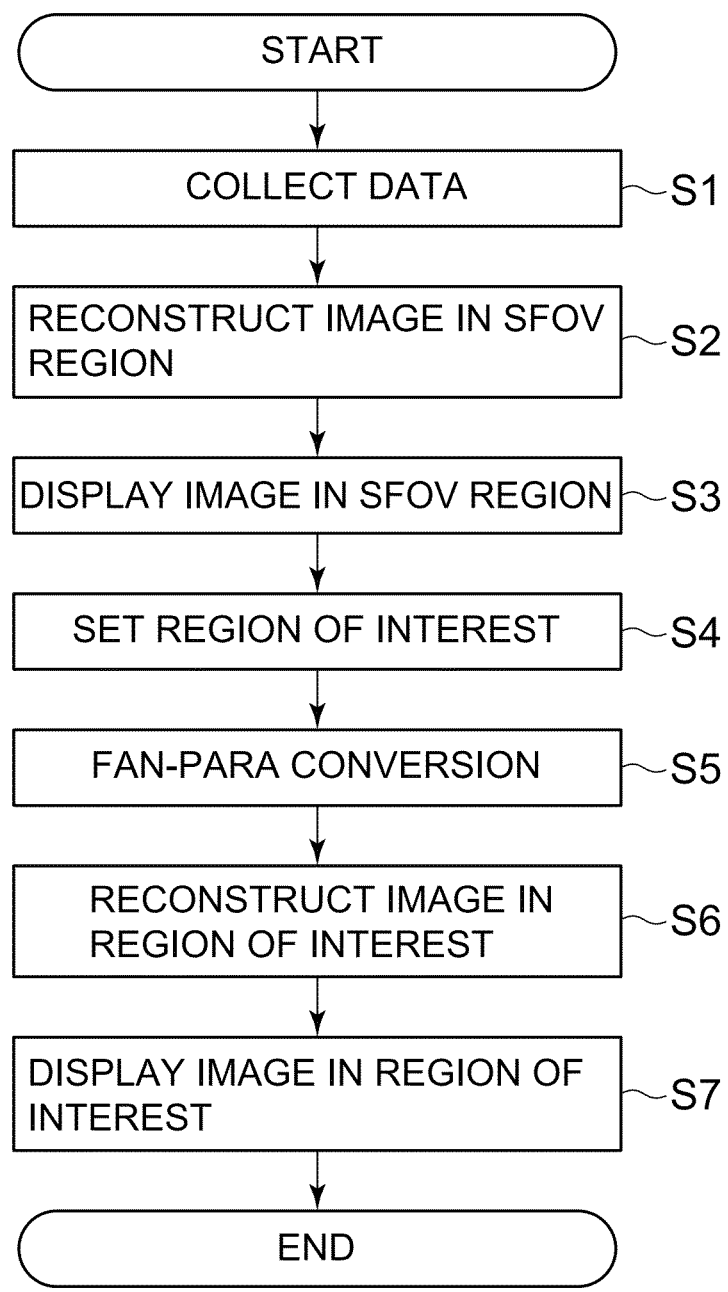
FIG. 12 is a flowchart showing a flow of image producing processing in the X-ray CT apparatus according to the exemplary embodiment.

FIG. 12 is a flowchart showing the flow of the image producing processing in the X-ray CT apparatus according to the exemplary embodiment.

In step S1, the data collecting section 31 performs a scan and collects fan-beam projection data in the plurality of views. In this regard, for example, the scan is performed by assigning the view for collecting actual data for each rotational angle corresponding to an arrangement interval of detector elements 24$i$ to the rotational angle for one turn of the scan. In addition, when producing fan-beam projection data of the number of views corresponding thereto including interpolation in the view direction with use of the actual data, at least 1000 or more views for collection of actual data are assigned to the rotational angle of one turn of the scan.

In step S2, the image reconstructing section 32 reconstructs images of the whole SFOV region by applying image reconstructing processing to the fan-beam projection data in the plurality of views collected in step S1.

In step S3, the display control section 35 displays the images of the whole SFOV region reconstructed in step S2 on a screen.

It step S4, the region-of-interest setting section 33 sets a region of interest. For example, a region specified by the operator on the image of the whole SFOV region displayed on the screen is set as the region of interest.

In step S5, the Fan-Para converting section 34 acquires regular-interval parallel-beam projection data by Fan-Para converting the fan-beam projection data in the plurality of views collected in step S1. In the Fan-Para conversion, interpolation processing in the view direction, rearrangement processing, and interpolation processing in the channel direction are performed. In this regard, the interpolation processing in the view direction is performed along the sinogram trajectory of a central point of the region of interest. Further, the interpolation processing in the channel direction is performed such that the interval of the X-ray paths in the channel direction becomes 1/N (N is, for example, an integer of two to four) of the reference interval $\Delta d$.

In step S6, the image reconstructing section 32 applies back projection processing to the regular-interval parallel-beam projection data acquired in step S5, and reconstructs the images of the region of interest or the whole SFOV region.

In step S7, the display control section 35 displays an image reconstructed in step S6. When the image reconstructed in step S6 is an image in the region of interest, such an image is enlarged and displayed.

Further, when an approximate position of the region of interest is known, steps S2 and S3 in the above flow may be skipped. Also, according to the above flow, the interpolation processing in the view direction is performed in the direction of the sinogram trajectory and the interpolation processing in the channel direction is performed such that the interval in the channel direction is smaller than the reference interval $\Delta d$. However, one of the two interpolation processes may be performed according to the conventional method.

Now, the result of comparing the reconstructed image according to the conventional method with the reconstructed image according to the present method will be explained.

Figure 13:
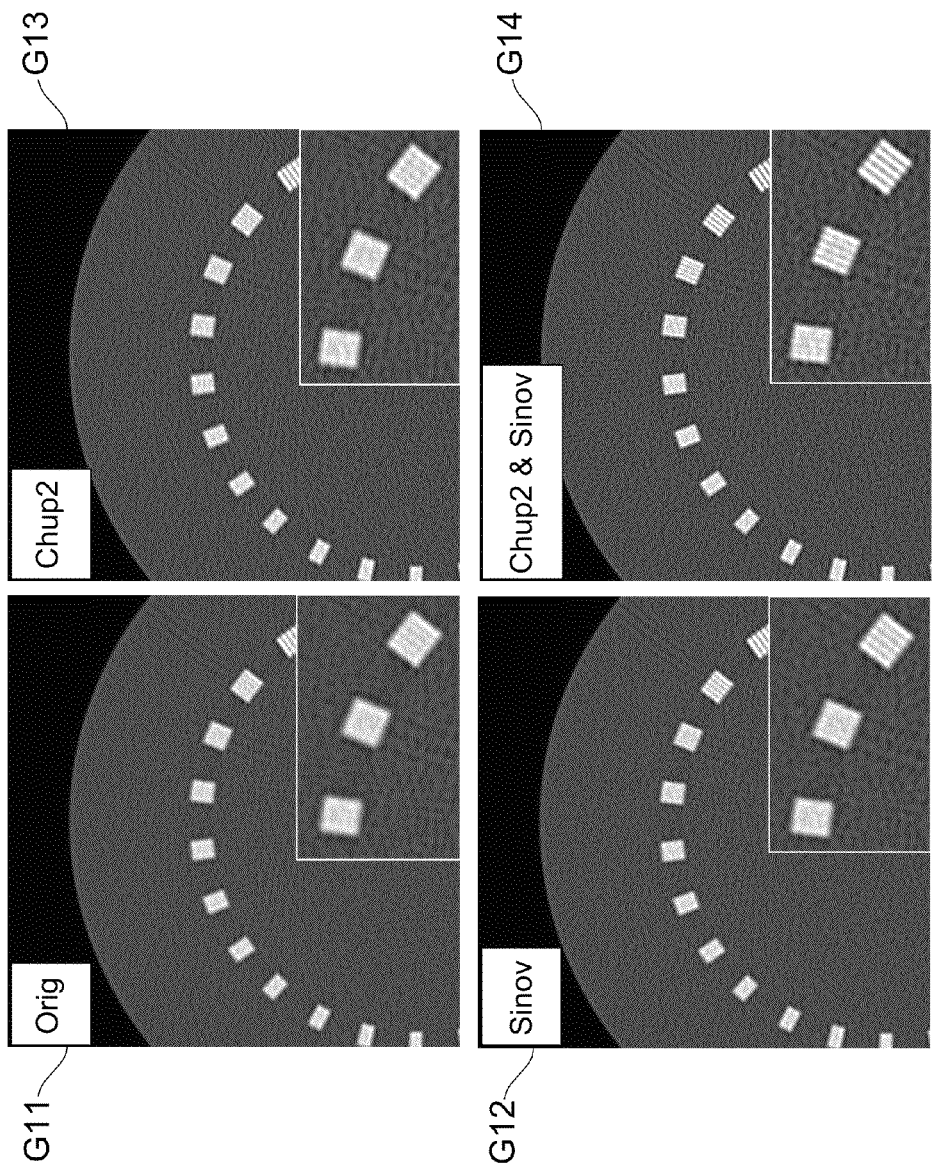
FIG. 13 is a diagram showing a first comparative example of an image according to the conventional method and an image according to the exemplary method.

FIG. 13 shows a first comparative example of the image according to the conventional method and the image according to the present method. The present example shows a case where a slit phantom is arranged such that its center is located in a range of 90 mm in radius from the iso-center ISO and a scan is performed. An image G11 (Orig) on the upper left is an original image according to the conventional method in which interpolation processing in the view direction is performed in a direction orthogonal to the channel direction and the interpolation processing in the channel direction is performed such that the interval of the X-ray paths may become the reference interval Δd. An image G12 (Sinov) on the lower left is an image made such that interpolation processing in the view direction is performed along a sinogram trajectory of a central point of the slit phantom and interpolation processing in the channel direction is performed, as in the conventional method, so that the interval of the X-ray paths may become the reference interval Δd. The image G13 (Chup 2) on the upper right is an image made such that interpolation processing in the view direction is performed, as in the conventional method, in the direction orthogonal to the channel direction, and that interpolation processing in the channel direction is performed so that the interval of the X-ray paths becomes equal to a half of the reference interval Δd, that is, sampling in the channel direction becomes twice dense. Still further, the image G14 (Chup 2 & Sinov) on the lower right is made such that interpolation in the view direction is performed along the sinogram trajectory of the central point of the slit phantom and interpolation processing in the channel direction is performed so that the interval of the X-ray paths becomes equal to a half of the reference interval Δd. A partially enlarged view of each image is shown in a lower right portion of each image.

It learned from the first comparative example that the spatial resolution is more improved in the images G12 to G14 according to the present method than in the image G11 according to the conventional method. In particular, in the image G14 according to the present method, there is shown a prominent synergistic effect by performing the interpolation processing in the view direction along the sinogram trajectory and by performing the interpolation processing in the channel direction such that the interval of the X-ray paths becomes a half of the reference interval Δd.

Figure 14:
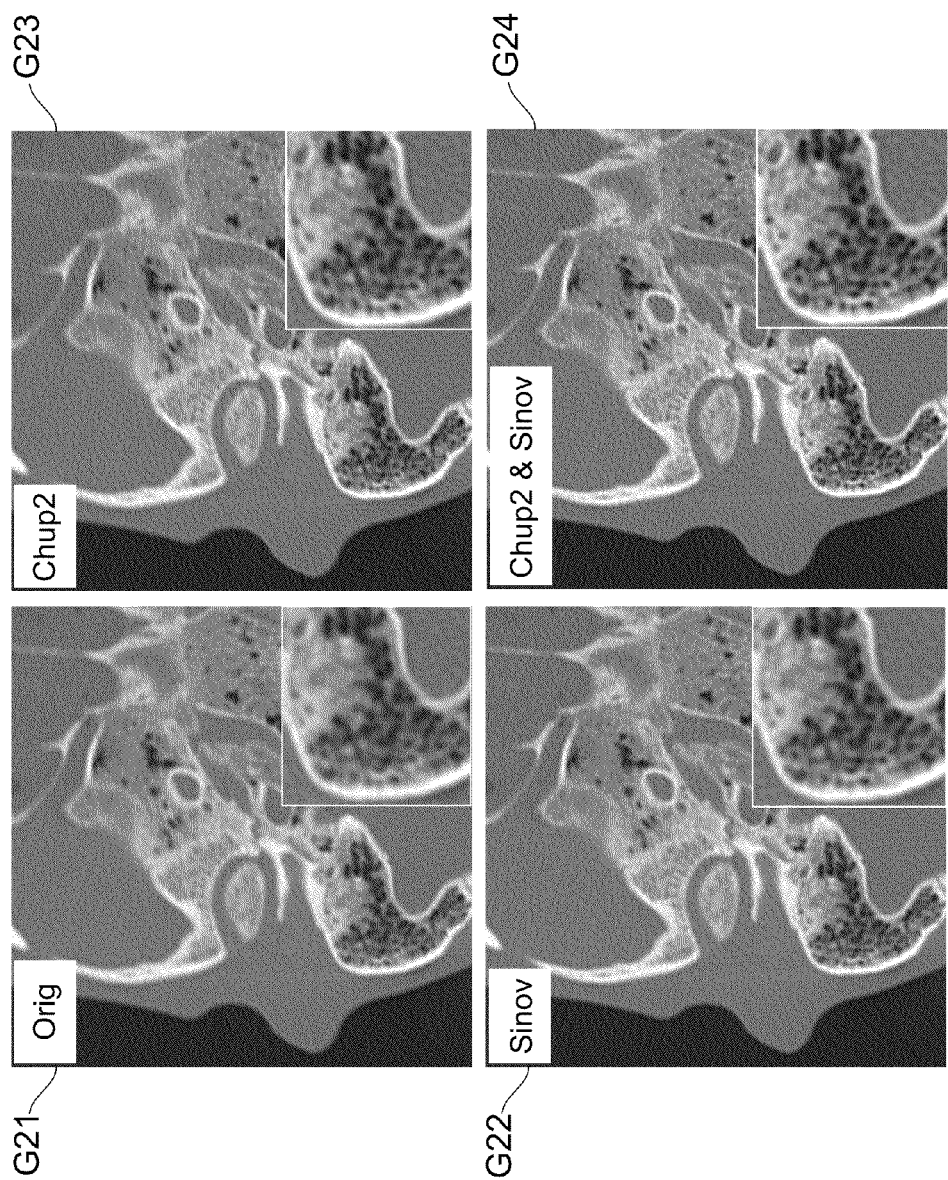
FIG. 14 is a diagram showing a second comparative example of an image according to the conventional method and an image according to the exemplary method.

FIG. 14 shows a second comparative example of the image according to the conventional method and the image according to the present method. The present example is an example where a head-portion phantom is scanned. The image shows a structure of an internal ear bone portion in a range of 125 mm in radius from the iso-center. The image G21 (Orig) on the upper left is an original image according to the conventional method in which interpolation processing in the view direction is performed in the direction orthogonal to the channel direction and the interpolation processing in the channel direction is performed such that the interval of the X-ray paths becomes Δd. The image G22 (Sinov) on the lower left is an image according to the present method in which interpolation processing in the view direction is performed along the sinogram trajectory of the central point of the internal ear bone and the interpolation processing in the channel direction is performed, as in the conventional method, such that the interval of the X-ray paths becomes Δd. The image G23 (Chup2) on the upper right is the one when the interpolation processing in the view direction is performed, as in the conventional method, in the direction orthogonal to the channel direction and the interpolation processing in the channel direction is performed such that the interval of the X-ray paths becomes a half of the reference interval Δd. Moreover, the image G24 (Chup2 & Sinov) on the lower right is the one where the interpolation processing in the view direction is performed along the sinogram trajectory of the central point of the internal ear bone and the interpolation processing in the channel direction is performed such that the interval of the X-ray paths becomes a half of the reference interval Δd. A partially enlarged view of each image is shown in a lower right portion of each image.

It is observed in the second comparative example also that, according to the present method, the spatial resolution in the internal bone structure is improved. In particular, in the image G24, a minute structure of the internal ear bone is shown with extremely high spatial resolution.

Thus, according to the exemplary embodiment, in the Fan-Para conversion, the interpolation processing in the view direction is performed along the sinogram trajectory or in the direction proximate to it. Therefore, it is possible to suppress the occurrence of positional inconsistency during the interpolation and to suppress the degradation in spatial resolution in the reconstructed image. Moreover, the interpolation processing in the channel direction is performed such that the interval of the X-ray paths in the channel direction becomes smaller than the reference interval acquired by dividing the arrangement interval of the detector elements in the channel direction by the projection enlarging rate at the detection plane of the detector when the so-called iso-center is used as a reference. Therefore, more of the highly precise data before the interpolation or the data after the interpolation close to the highly precise data can be used for the back projection processing, suppressing the degradation in spatial resolution in the reconstructed image even when the Fan-Para conversion is performed.

Also, various modifications, additions, etc. can be made to the exemplary embodiment without departing from the spirit and the scope of the disclosure.

For example, according to the exemplary embodiment, the interpolation processing in the view direction is performed along the sinogram trajectory, or the curve or straight line proximate to it. However, the positional inconsistency in the channel direction can be suppressed simply by performing the interpolation processing along a curve or a straight line made by deforming or rotating a straight line parallel to the view direction so as to be proximate to a sinogram trajectory at a desired position in the SFOV region, which brings about the effect of suppressing the degradation in spatial resolution near the above desired position in the reconstructed image.

Also, for example, according to the exemplary embodiment, in the interpolation processing in the view direction, all of them are performed in the direction along the sinogram trajectory, or a curve or a straight line made proximate to it. However, part of the interpolation processing alone may be performed in the direction along the sinogram trajectory, or the curve or the straight line made proximate to it.

Also, for example, the systems and methods described herein have been described on the assumption that the the systems and methods are adapted to an X-ray CT apparatus. However, the disclosure can also be applied to an image producing apparatus performing the above image producing processing. The exemplary embodiment may also be construed as a program that allows a computer to function like the image producing apparatus and a storage medium on which the program is stored.

Also, for example, while the exemplary embodiment has been described on the assumption that the systems and methods described herein are adapted to an X-ray CT apparatus, the disclosure can be applied also to X-ray CT apparatuses combined with any other apparatus such as a PET-CT apparatus, a SPECT-CT apparatus, and a general imaging apparatus.

What is claimed is:

1. An image producing method comprising:
acquiring regular-interval parallel-beam projection data whose intervals in a channel direction are the same and parallel to each other in a plurality of view directions by applying interpolation processing in a view direction, rearrangement processing, and interpolation processing in the channel direction to fan-beam projection data in a plurality of views collected during a scan performed by rotating, around a subject, a radiation source and a detector in which a plurality of detector elements are arranged in the channel direction; and
reconstructing an image by applying back projection processing to the acquired regular-interval parallel-beam projection data,
wherein the interpolation processing in the view direction includes interpolation processing which is performed along a curve or a first straight line made by deforming or rotating a second straight line parallel to the view direction so as to be proximate to a trajectory drawn by dots corresponding to a desired position in a Scan Field Of View region on a sinogram of the collected fan-beam projection data in the plurality of views.

2. An image producing method according to claim 1, wherein the interpolation processing in the view direction includes processing that calculates data of a channel in a virtual view located among measured views, and
wherein the processing calculates a plurality of data items in a virtual channel on a curve parallel to the trajectory or a curve proximate to the trajectory and passing through the channel on the sinogram, the plurality of data items calculated by interpolating data of channels in a plurality of the measured views that are proximate to the virtual view and, further, calculating data of the channel in the virtual view by interpolating the acquired plurality of data items.

3. An image producing method according to claim 1, wherein the interpolation processing in the view direction includes processing that calculates data of a channel in a virtual view located among measured views, and
wherein the processing calculates a plurality of data items in a virtual channel on a straight line parallel to a tangent at a position corresponding to the virtual view on the trajectory or a curve proximate to the trajectory and passing through the channel on the sinogram, the plurality of data items calculated by interpolating data of channels in a plurality of the measured views that are proximate to the virtual view and, further, calculating data of the channel in the virtual view by interpolating the acquired plurality of data items.

4. An image producing method according to claim 1, wherein the desired position is a typical position in a region of interest set in the Scan Field Of View region and is a position different from a center of the Scan Field Of View region.

5. An image producing method according to claim 4, wherein the typical position in the region of interest is a center of the region of interest.

6. An image producing method according to claim 1, wherein the curve proximate to the trajectory is a curve expressed by a trigonometric function.

7. An image producing method according to claim 1, wherein the interpolation processing in the channel direction is processing in which the intervals of the regular-interval parallel-beam projection data in the channel direction are smaller than a reference interval made by dividing an arrangement interval of the detector elements in the channel direction by a projection enlarging rate at a detection plane of the detector when a center of rotation of the radiation source and the detector is used as a reference.

8. An image producing method according to claim 7, wherein the intervals of the regular-interval parallel-beam projection data in the channel direction are equal to 1/N (where N is an integer greater than one) of the reference interval.

9. An image producing method according to claim 7, wherein a position of the regular-interval parallel-beam projection data is so set as to substantially superpose on a position of irregular-interval parallel-beam projection data in the channel direction that is acquired by applying the interpolation processing in the view direction and rearrangement processing to the fan-beam projection data near the center of rotation.

10. An image producing apparatus comprising:
a data converting section configured to acquire regular-interval parallel-beam projection data whose intervals in a channel direction are the same and parallel to each other in a plurality of view directions by applying interpolation processing in a view direction, rearrangement processing, and interpolation processing in the channel direction to fan-beam projection data in a plurality of views collected during a scan performed by rotating, around a subject, a radiation source and a detector in which a plurality of detector elements are arranged in the channel direction; and
an image reconstructing section configured to reconstruct an image by applying back projection processing to the acquired regular-interval parallel-beam projection data,
wherein the interpolation processing in the view direction includes interpolation processing which is performed along a curve or a first straight line made by deforming or rotating a second straight line parallel to the view direction so as to be proximate to a trajectory drawn by dots corresponding to a desired position in a Scan Field Of View region on a sinogram of the collected fan-beam projection data in the plurality of views.

11. An image producing apparatus according to claim 10, wherein the interpolation processing in the view direction includes processing that calculates data of a channel in a virtual view located among measured views, and
wherein the processing calculates a plurality of data items in a virtual channel on a curve parallel to the trajectory or a curve proximate to the trajectory and passing through the channel on the sinogram, the plurality of data items calculated by interpolating data of channels in a plurality of the measured views that are proximate to the virtual view and, further, calculating data of the channel in the virtual view by interpolating the acquired plurality of data items.

12. An image producing apparatus according to claim 10, wherein the interpolation processing in the view direction includes processing that calculates data of a channel in a virtual view located among measured views, and
wherein the processing calculates a plurality of data items in a virtual channel on a straight line parallel to a tangent at a position corresponding to the virtual view on the trajectory or a curve proximate to the trajectory and passing through the channel on the sinogram, the plurality of data items calculated by interpolating data of channels in a plurality of the measured views that are proximate to the virtual view and, further, calculating data of a channel in the virtual view by interpolating the acquired plurality of data items.

13. An image producing apparatus according to claim 10, wherein the desired position is a typical position in a region of interest set in the Scan Field Of View region and is a position different from a center of the Scan Field Of View region.

14. An image producing apparatus according to claim 13, wherein the typical position in the region of interest is a center of said region of interest.

15. An image producing apparatus according to claim 10, wherein the curve proximate to the trajectory is a curve expressed by a trigonometric function.

16. An image producing apparatus according to claim 10, wherein the interpolation processing in the channel direction is processing in which the intervals of the regular-interval parallel-beam projection data in the channel direction are smaller than a reference interval made by dividing an arrangement interval of the detector elements in the channel direction by a projection enlarging rate at a detection plane of the detector when a center of rotation of the radiation source and detector is used as a reference.

17. An image producing apparatus according to claim 16, wherein the intervals of the regular-interval parallel-beam projection data in the channel direction are equal to 1/N (where N is an integer greater than one) of the reference interval.

18. An image producing apparatus according to claim 16, wherein a position of the regular-interval parallel-beam projection data so set as to substantially superpose on a position of irregular-interval parallel-beam projection data in the channel direction that is acquired by applying the interpolation processing in the view direction and the rearrangement processing to the fan-beam projection data near the center of rotation.

19. A radiation tomographic imaging apparatus comprising:
   a radiation source;
   a detector in which a plurality of detector elements are arranged in a channel direction;
   a data collecting section configured to collect fan-beam projection data in a plurality of views by a scan in which said radiation source and said detector are rotated around a subject;
   a data converting section configured to acquire regular-interval parallel-beam projection data whose intervals in a channel direction are the same and parallel to each other in a plurality of view directions by applying interpolation processing in a view direction, rearrangement processing, and interpolation processing in the channel direction to said collected fan-beam projection data in a plurality of views; and
   an image reconstructing section configured to reconstruct an image by applying back projection processing to the acquired regular-interval parallel-beam projection data,
   wherein the interpolation processing in the view direction includes interpolation processing which is performed along a curve or a first straight line made by deforming or rotating a second straight line parallel to the view direction so as to be proximate to a trajectory drawn by dots corresponding to a desired position in a Scan Field Of View region on a sinogram of the collected fan-beam projection data in the plurality of views.

20. A non-transitory computer-readable medium encoded with a computer program configured to cause a computer to function as:
   a data converting section configured to acquire regular-interval parallel-beam projection data whose intervals in a channel direction are the same and being parallel to each other in a plurality of view directions by applying interpolation processing in a view direction, rearrangement processing, and interpolation processing in the channel direction to fan-beam projection data in a plurality of views collected during a scan performed by rotating, around a subject, a radiation source and a detector in which a plurality of detector elements are arranged in the channel direction; and
   an image reconstructing section configured to reconstruct an image by applying back projection processing to the acquired regular-interval parallel-beam projection data,
   wherein the interpolation processing in the view direction includes interpolation processing which is performed along a curve or a first straight line made by deforming or rotating a second straight line parallel to the view direction so as to be proximate to a trajectory drawn by dots corresponding to a desired position in a Scan Field Of View region on a sinogram of the collected fan-beam projection data in the plurality of views.

* * * * *